United States Patent
Soliman

[11] Patent Number: 6,055,428
[45] Date of Patent: *Apr. 25, 2000

[54] METHOD AND APPARATUS FOR PERFORMING SOFT HAND-OFF IN A WIRELESS COMMUNICATION SYSTEM

[75] Inventor: Samir S. Soliman, San Diego, Calif.

[73] Assignee: Qualcomm Incorporated, San Diego, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/897,865

[22] Filed: Jul. 21, 1997

[51] Int. Cl.⁷ ..................... H04B 7/26
[52] U.S. Cl. ............ 455/437; 455/436; 455/442; 370/332
[58] Field of Search ............... 455/436, 437, 455/442; 370/332, 335, 491

[56] References Cited

U.S. PATENT DOCUMENTS

| | | | |
|---|---|---|---|
| 4,112,257 | 9/1978 | Frost | 179/2 EB |
| 4,123,718 | 10/1978 | Lampert et al. | 325/474 |
| 4,765,753 | 8/1988 | Schmidt | 379/60 |
| 4,777,653 | 10/1988 | Bonnerot et al. | 455/69 |
| 4,811,421 | 3/1989 | Havel et al. | 455/69 |
| 4,868,795 | 9/1989 | McDavid et al. | 367/77 |
| 4,870,698 | 9/1989 | Katsuyama et al. | 455/67 |
| 4,901,307 | 2/1990 | Gilhousen et al. | 370/18 |
| 5,056,109 | 10/1991 | Gilhousen et al. | 375/1 |
| 5,093,840 | 3/1992 | Schilling | 375/1 |
| 5,101,501 | 3/1992 | Gilhousen et al. | 455/442 |
| 5,103,459 | 4/1992 | Gilhousen et al. | 375/1 |
| 5,107,487 | 4/1992 | Vilmur et al. | 370/18 |
| 5,128,965 | 7/1992 | Henriksson | 375/58 |
| 5,204,876 | 4/1993 | Bruckert et al. | 375/1 |
| 5,220,678 | 6/1993 | Feei | 455/69 |
| 5,245,629 | 9/1993 | Hall | 375/1 |
| 5,257,283 | 10/1993 | Gilhousen et al. | 375/1 |
| 5,265,119 | 11/1993 | Gilhousen et al. | 375/1 |
| 5,267,261 | 11/1993 | Blakeney, II et al | 370/332 |
| 5,267,262 | 11/1993 | Wheatley, III | 375/1 |
| 5,305,468 | 4/1994 | Bruckert et al. | 455/69 |
| 5,383,219 | 1/1995 | Wheatley, III et al. | 375/1 |
| 5,390,338 | 2/1995 | Bodin et al. | 455/33.1 |
| 5,450,616 | 9/1995 | Rom | 455/69 |
| 5,465,399 | 11/1995 | Oberholtzer et al. | 455/69 |
| 5,483,669 | 1/1996 | Barnett et al. | 455/437 |
| 5,487,180 | 1/1996 | Ohtake | 455/54.1 |
| 5,548,808 | 8/1996 | Bruckert et al. | 455/33.2 |
| 5,548,812 | 8/1996 | Padovani et al. | 455/442 |
| 5,574,983 | 11/1996 | Douzono et al. | 455/69 |
| 5,577,022 | 11/1996 | Padovani et al. | 370/332 |
| 5,640,414 | 6/1997 | Blakeney, II et al. | 375/200 |
| 5,854,785 | 12/1998 | Willey | 370/332 |

FOREIGN PATENT DOCUMENTS

| | | |
|---|---|---|
| 0756387 | 1/1997 | European Pat. Off. . |
| 9406218 | 3/1994 | WIPO .............. H04Q 7/04 |
| 9512297 | 5/1995 | WIPO . |
| 9708911 | 3/1997 | WIPO . |

*Primary Examiner*—Wellington Chin
*Assistant Examiner*—Isaak R. Jama
*Attorney, Agent, or Firm*—Russell B. Miller; Roger W. Martin; Kent D. Baker

[57] ABSTRACT

At the mobile station the measured pilot energy of each pilot in the candidate set is iteratively compared against a threshold generated in accordance with the sum of the energies of the pilots in the active set. If the strongest pilot in the candidate set satisfies this threshold condition, it is added to the revised active set. A second iterative process is performed to determine whether a pilot should be deleted from the revised active set. The mobile station determines whether a change to the current active set is desirable by measuring the energies of the pilots in the active set and the candidate set, and dynamically adjusting the necessary thresholds based on its own estimation of the communication environment.

10 Claims, 7 Drawing Sheets

METHOD AND APPARATUS FOR PERFORMING SOFT HAND-OFF IN A WIRELESS COMMUNICATION SYSTEM

BACKGROUND OF THE INVENTION

I. Field of the Invention

The present invention relates to communication systems. More particularly, the present invention relates to a novel and improved method and system for performing hand-off in a wireless communication system.

II. Description of the Related Art

The use of code division multiple access (CDMA) modulation techniques is but one of several techniques for facilitating communications in which a large number of system users are present. Although other techniques, such as time division multiple access (TDMA), frequency division multiple access (FDMA) and AM modulation schemes such as amplitude companded single sideband (ACSSB) are known, CDMA has significant advantages over these other modulation techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS" and U.S. Pat. No. 5,103,459, entitled "SYSTEM AND METHOD FOR GENERATING SIGNAL WAVEFORMS IN A CDMA CELLULAR TELEPHONE SYSTEM", both of which are assigned to the assignee of the present invention and are incorporated by reference. The method for providing CDMA mobile communications was standardized by the Telecommunications Industry Association in TIA/EIA/IS-95-A entitled "Mobile Station-Base Station Compatibility Standard for Dual-Mode Wideband Spread Spectrum Cellular System".

In the just mentioned patents, a multiple access technique is disclosed in which a large number of mobile telephone users, each having a transceiver, communicate through satellite repeaters or terrestrial base stations (also known as cell base stations or cell-sites) using code division multiple access (CDMA) spread spectrum communication signals. In using CDMA communications, the frequency spectrum can be reused multiple times thus permitting an increase in system user capacity. The use of CDMA techniques results in much higher spectral efficiency than can be achieved using other multiple access techniques.

A method for simultaneously demodulating data that has traveled along different propagation paths from one base station and for simultaneously demodulating data redundantly provided from more than one base station is disclosed in U.S. Pat. No. 5,109,390 (the '390 patent), entitled "DIVERSITY RECEIVER IN A CDMA CELLULAR COMMUNICATION SYSTEM", assigned to the assignee of the present invention and incorporated by reference herein. In the '390 patent, the separately demodulated signals are combined to provide an estimate of the transmitted data which has higher reliability than the data demodulated by any one path or from any one base station.

Handoffs can generally be divided into two categories—hard handoffs and soft handoffs. In a hard handoff, when a mobile station leaves and origination cell and enters a destination cell, the mobile station breaks its communication link with the origination cell and thereafter establishes a new communication link with the destination cell. In soft handoff, the mobile station completes a communication link with the destination cell prior to breaking its communication link with the origination cell. Thus, in soft handoff, the mobile station is redundantly in communication with both the origination cell and the destination cell for some period of time.

Soft handoffs are far less likely to drop calls than hard handoffs. In addition, when a mobile station travels near a cell boundary, it may make repeated handoff requests in response to small changes in the environment. This problem, referred to as ping-ponging, is also greatly lessened by soft handoff. The process for performing soft handoff is described in detail in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM" assigned to the assignee of the present invention and incorporated by reference herein.

An improved soft handoff technique is disclosed in U.S. Pat. No. 5,267,261, entitled "MOBILE STATION ASSISTED SOFT HANDOFF IN A CDMA CELLULAR COMMUNICATIONS SYSTEM", which is assigned to the assignee of the present invention and incorporated by reference herein. In the system of the '261 patent, the soft handoff process is improved by measuring the strength of "pilot" signals transmitted by each base station within the system at the mobile station. These pilot strength measurements are of assistance in the soft handoff process by facilitating identification of viable base station handoff candidates.

The viable base station candidates can be divided into four sets. The first set, referred to as the Active Set, comprises base stations which are currently in communication with the mobile station. The second set, referred to as the Candidate Set, comprises base stations which have been determined to be of sufficient strength to be of use to the mobile station. Base stations are added to the candidate set when their measured pilot energy exceeds a predetermined threshold $T_{ADD}$. The third set is the set of base stations which are in the vicinity of the mobile station ( and which are not included in the Active Set or the Candidate Set). And the fourth set is the Remaining Set which consists of all other base stations.

In an IS-95-A communication system, the mobile station sends a Pilot Strength Measurement Message when it finds a pilot of sufficient strength that is not associated with any the of the Forward Traffic Channels currently being demodulated or when the strength of a pilot that is associated with one of the Forward Traffic Channels being demodulated drops below a threshold for a predetermined period of time. The mobile station sends a Pilot Strength Measurement Message following the detection of a change in the strength of a pilot under the following three conditions:

1. The strength of a Neighbor Set or Remaining Set pilot is found above the threshold $T_{ADD}$.
2. The strength of a Candidate Set pilot exceeds the strength of an Active Set pilot by more that a threshold ($T_{COMP}$).
3. The strength of a pilot in the Active Set of Candidate Set has fallen below a threshold ($T_{DROP}$) for greater than a predetermined time period.

The Pilot Strength Measurement Message identifies the base station and the measured pilot energy in decibels.

A negative aspect of soft handoff is that because it involves redundantly transmitting information it consumes the available communication resource. However, soft handoff can provide great improvement in the quality of communication. Therefore, there is a need felt in the art for a method of minimizing the number of base stations transmitting redundant data to a mobile station user which provides sufficient transmission quality.

SUMMARY OF THE INVENTION

The present invention is a novel and improved method and apparatus for providing soft handoff in a mobile communication system. It should be noted at the outset, that one of the biggest problems with current systems is that the members of active set are determined in accordance with comparisons of measured pilot energy with fixed thresholds. However, the value of providing a redundant communication link to a mobile station depends strongly on the energy of other signals being provided to the mobile station. For example, the value of redundantly transmitting to a mobile station a signal with received energy corresponding to a pilot strength of −15 dB will not be of much value, if the mobile station is already receiving a transmission with signal energy corresponding to a pilot strength of −5 dB. However, redundantly transmitting to a mobile station a signal of received energy corresponding to a pilot strength of −15 dB may be of substantial value, if the mobile station is receiving transmissions with signal energy corresponding to a pilot energy of only −13 dB.

At the mobile station, in determining whether to send a message indicating that a pilot from the candidate set should be moved to a revised active set, the measured pilot energy of each pilot in the candidate set is iteratively compared against a threshold generated in accordance with the a variable COMBINED_PILOT which is the sum of the energies (i.e. the Ec/Io) of the pilots in the active set. In the preferred embodiment, the optimum value of this threshold is determined by the mobile station itself, without the need to send these thresholds over the air or to verify the mobile station requests at the base station. If the strongest pilot in the candidate set satisfies this threshold condition, it is added to the revised active set, and COMBINED_PILOT is recomputed to include the newly added pilot signal.

Following the iterative process performed on the members of the candidate set, a second iterative process is performed to determine whether a pilot should be deleted from the revised active set. In this operation, pilots are tested from the weakest member of revised active set to the strongest. A COMBINED_PILOT energy value is computed that is the sum of the energies of all pilots belonging to the active set. A threshold value is generated in accordance with the COMBINED_PILOT value as described above and the pilot signal being tested is compared with the threshold. Again, this threshold is determined at the mobile station in order to avoid excessive signaling. If a pilot has been below the threshold value for a predetermined period of time, a message would be sent to the base station indicating that such a pilot should be dropped.

The revised active set list is transmitted to the base station controller through the base stations with which the mobile station is in communication. The base station controller sets up the communication links with the base stations in the mobile generated revised active set list and generates an acknowledgment for the mobile station when the links are set up. The mobile station then conducts communications through the base stations of the revised active set.

In the preferred embodiment, the mobile station monitors the pilot signals and in response to the monitored pilot signals the mobile station compiles members of the candidate set. Moreover, the mobile station determines whether a change to the current active set is desirable in view of the criteria discussed above by measuring the energies of the pilots in the active set and the candidate set, and dynamically adjusting the necessary thresholds based on its own estimation of the communication environment. Upon determining any change in the desired membership of the active set, the mobile station generates a pilot strength measurement message that as described above includes the identities of all pilots in the candidate and active sets, their corresponding measured energy values, and a corresponding indication whether the pilot should remain in the sets or be moved into the neighbor set.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
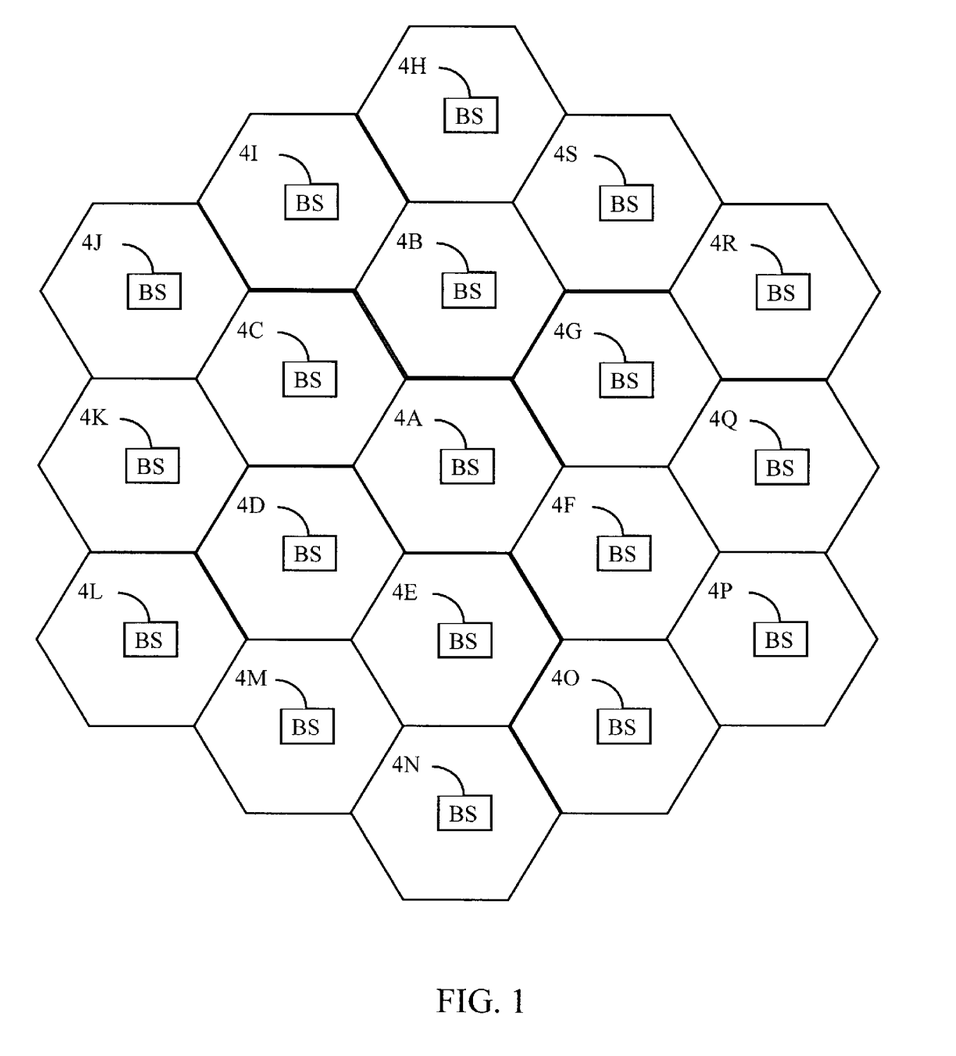
FIG. 1 is an illustration of a cellular communication network.

FIG. 1 illustrates wireless communication network in which the geographical area has been divided up into coverage areas referred to as cells and illustrated by a set of adjacent hexagons. Each cell is served by a corresponding base station 4. Each base station 4 transmits a pilot signal which uniquely identifies that base station. In the exemplary embodiment, the base stations 4 are CDMA base stations. A detail description of soft hand-off in a wireless CDMA communication system is described in detail in the aforementioned U.S. Pat. Nos. 5,101,501 and 5,267,261.

Mobile station 2 is located within the cell served by base station 4A. Since mobile station 2 is located near the cell boundary, it will likely be in a soft hand-off condition, in which it is simultaneously in communication with more than one base station. It may, for example be in communication with base stations 4A and 4B. Thus, base stations 4A and 4B are said to make up the active set. Moreover, it may be that mobile station 2 has determined other base stations in its vicinity to have a measured pilot energy above a predetermined threshold $T_{ADD}$, but that those base stations are not currently in communication with the mobile station. Those pilots are said to make up the candidate set. The candidate set could be made up of base stations 4C and 4G.

Figure 2:
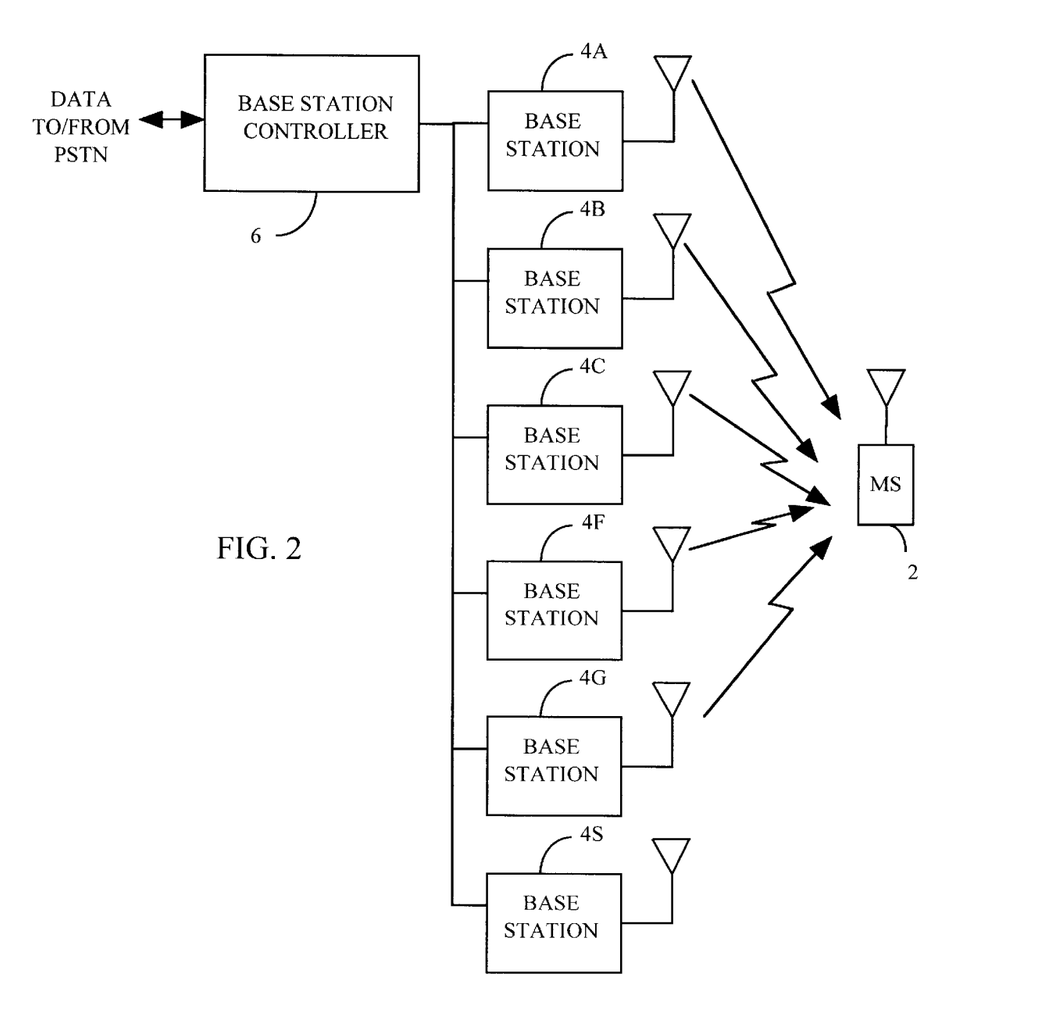
FIG. 2 is an illustration of the cellular communication network of FIG. 1 which includes the base station controller.

Referring to FIG. 2, a typical communication network is illustrated. Data directed to mobile station 2 is provided from a public switched telephone network or other wireless system (not shown) to base station controller 6. Base station controller 6 provides the data to the base stations in mobile station 2's active list. In the example, base station controller 6 redundantly provides data to and receives data from base stations 4A and 4B The present invention is equally applicable to conditions where each cell is divided into sectors. Communications to and from each sector can be separately received and demodulated by mobile station 2. For simplicity, the discussion will be described wherein in each base of base station 4 are uniquely located base stations. However, it will be readily seen by one skilled in the art that the present invention is equally applicable to sectored cells, simply by considering the possibility that the base stations can be collocated and transmitting to separate sectors within a cell. The condition where a mobile station is in simultaneous communication with more than one sector of a cell is referred to as softer handoff. The method and apparatus for performing softer hand-off are described in detail in copending U.S. patent application Ser. No. 08/144,903, entitled "METHOD AND APPARATUS FOR PERFORMING HANDOFF BETWEEN SECTORS OF A COMMON BASE STATION", filed Oct. 30, 1993, which is assigned to the assignee of the present invention and incorporated by reference herein.

Within mobile station 2, each copy of the data packet is separately received, demodulated and decoded. The decoded data is then combined to give a estimate of the data of greater reliability than any one of demodulated estimates of the data.

Figure 3:
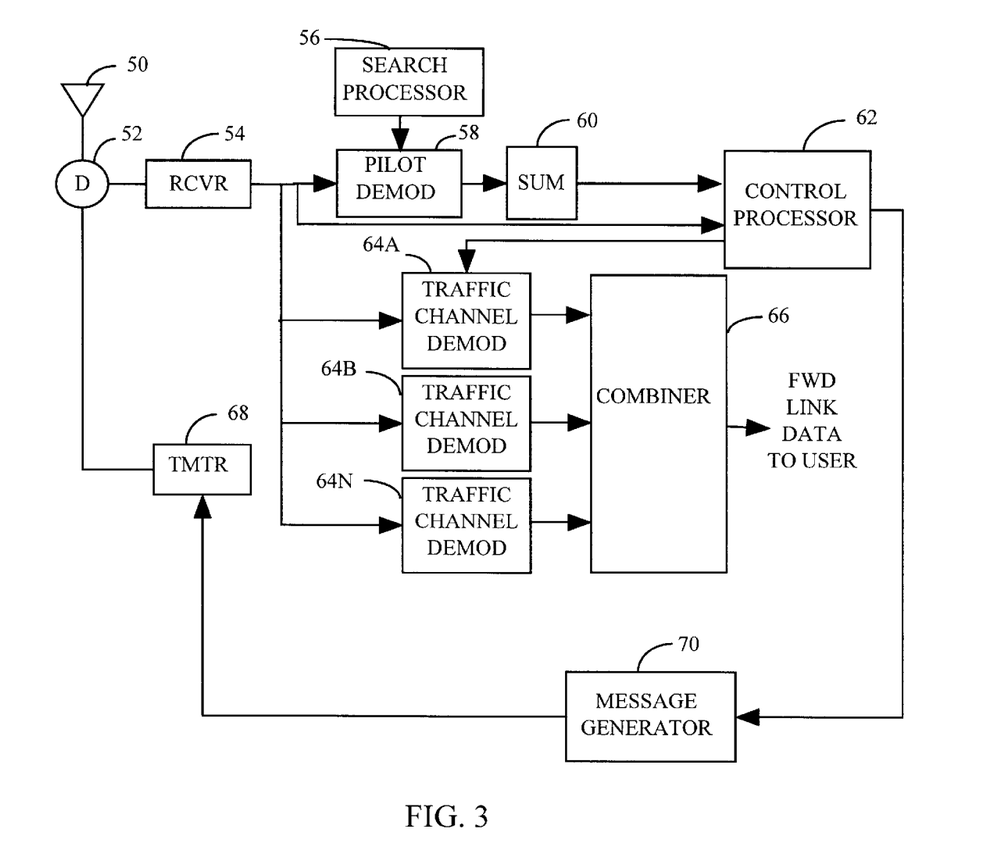
FIG. 3 is a block diagram of the mobile station of the present invention.

FIG. 3 illustrates mobile station 2 of the present invention. Mobile station 2 continuously or at intermittent intervals measures the strength of pilot signals of base stations 4. Signals received by antenna 50 of mobile station 2 are provided through duplexer 52 to receiver (RCVR) 54 which amplifies, downconverts, and filters the received signal and provides it to pilot demodulator 58 of searcher subsystem 55.

In addition, the received signal is provided to traffic demodulators 64A–64N. Traffic demodulators 64A–64N, or a subset thereof, separately demodulate signals received by mobile station 2. The demodulated signals from traffic demodulators 64A–64N are provided to combiner 66 which combines the demodulated data, which in turn provides an improved estimate of the transmitted data.

Mobile station 2 measures the strength of pilot channels. Control processor 62 provides acquisition parameters to search processor 56. In the exemplary embodiment of a CDMA communication system, control processor 62 provides a PN offset to search processor 56. Search processor 56 generates a PN sequence which is used by pilot demodulator 58 to demodulate the received signal. The demodulated pilot signal is provided to energy accumulator 60 which measures the energy of the demodulated pilot signal, by accumulating the energy for predetermined lengths of time.

The measured pilot energy values are provided to control processor 62. In the exemplary embodiment, control processor 62 compares the energy values to dynamic thresholds as described below.

Mobile station 2 transmits a Pilot Strength Measurement Message which includes all pilots with energy greater than the dynamic threshold and all members of the current active set who's measured pilot energy has not fallen below the dynamic threshold for more than a predetermined time period. In the exemplary embodiment, mobile station 2 generates and transmits a Pilot Strength Measurement Message following the detection of a change in the strength of a pilot under the following three conditions:

1. The strength of a Neighbor Set or Remaining Set pilot is found above the threshold the dynamic threshold.

2. The strength of a Candidate Set pilot exceeds the strength of an Active Set pilot by more that a threshold ($T_{COMP}$).

3. The strength of a pilot in the Active Set has fallen below a threshold a dynamic threshold for longer than a predetermined time period.

In the exemplary embodiment, the Pilot Strength Measurement Message identifies the pilot and provides a corresponding measured pilot energy. In the exemplary embodiment, the base stations in the Pilot Strength Measurement Message are identified by their pilot offsets and their corresponding measured pilot energy is provided in units of decibels. The dynamic threshold may be calculated by the mobile station.

Control processor 62 provides the identities of the pilots and their corresponding measured pilot energies to message generator 70. Message generator 70 generates a Pilot Strength Measurement Message containing the information. The Pilot Strength Measurement Message is provided to transmitter (TMTR) 68, which encodes, modulates, upconverts and amplifies the message. The message is then transmitted through duplexer 52 and antenna 50.

Figure 4:
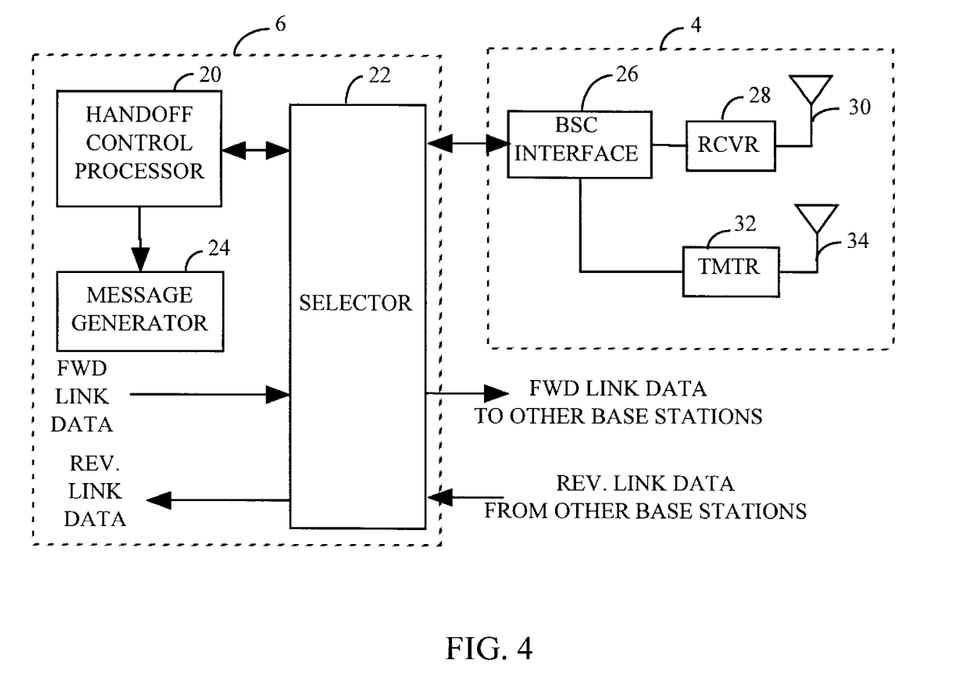
FIG. 4 is a block diagram of the base station of the present invention.

Referring to FIG. 4, the Pilot Strength Measurement Message is received by antenna 30 of base station 4 and provided to receiver (RCVR) 28, which amplifies, down converts, demodulates and decodes the received signal and provides the message to base station controller (BSC) interface 26. Base station controller (BSC) interface 26 sends the message to base station controller (BSC) 6. The message is provided to selector 22, which may also receive the message redundantly from other base stations which are in communication with mobile station 2. Selector 22 combines message estimates received from the base stations in communication with mobile station 2 to provide improved packet estimates.

In the preferred embodiment of the present invention, the mobile station 2 monitors the pilot signals and compiles members of each of the above-mentioned sets (active, candidate, and neighbor). Additionally, the mobile station 2 determines whether a change to the current active set is desirable according to the following linear relationships:

$$Y1 = SOFT\_SLOPE * COMBINED\_PILOT + ADD\_INTERCEPT \quad (1)$$

$$Y2 = SOFT\_SLOPE * COMBINED\_PILOT + DROP\_INTERCEPT \quad (2)$$

where Y1 is the dynamic threshold above which a candidate set pilot's measured energy must rise before the mobile station will request adding it to the revised active set, and Y2 is the dynamic threshold below which an active set pilot's energy must fall before the mobile station will request moving it from the active set to the candidate set. To provide hysteresis, Y1 is preferably greater than Y2.

From Equations (1) and (2), it can be seen that if a particular active set pilot's measured energy falls below Y2, it is moved to the candidate set. In order for that same pilot to be added back into the revised active set, one of two things must happen; either the value of COMBINED_PILOT decreases by some amount $\Delta_1$, or that pilot's own measured energy increases by some amount $\Delta_2$. Thus, it can be seen that $\Delta_1$ and $\Delta_2$ are the hysteresis values of the COMBINED_PILOT and individual pilot energy respectively needed to prevent a given pilot from being repeatedly moving in and out of the active set.

Thus, pilots should be added to the revised active set when the COMBINED_PILOT value is less than or equal to $X_1$, and should be dropped from the active set when the COMBINED_PILOT value is greater than or equal to $X_2$. From Equations (1) and (2), it can be shown that:

$$SOFT\_SLOPE = \Delta_2/\Delta_1; \quad (3)$$

$$DROP\_INTERCEPT = T_{DROP} - X_2 * \Delta_2/\Delta_1; \quad (4)$$

and $$ADD\_INTERCEPT = DROP\_INTERCEPT + \Delta_2. \quad (5)$$

Figure 5:
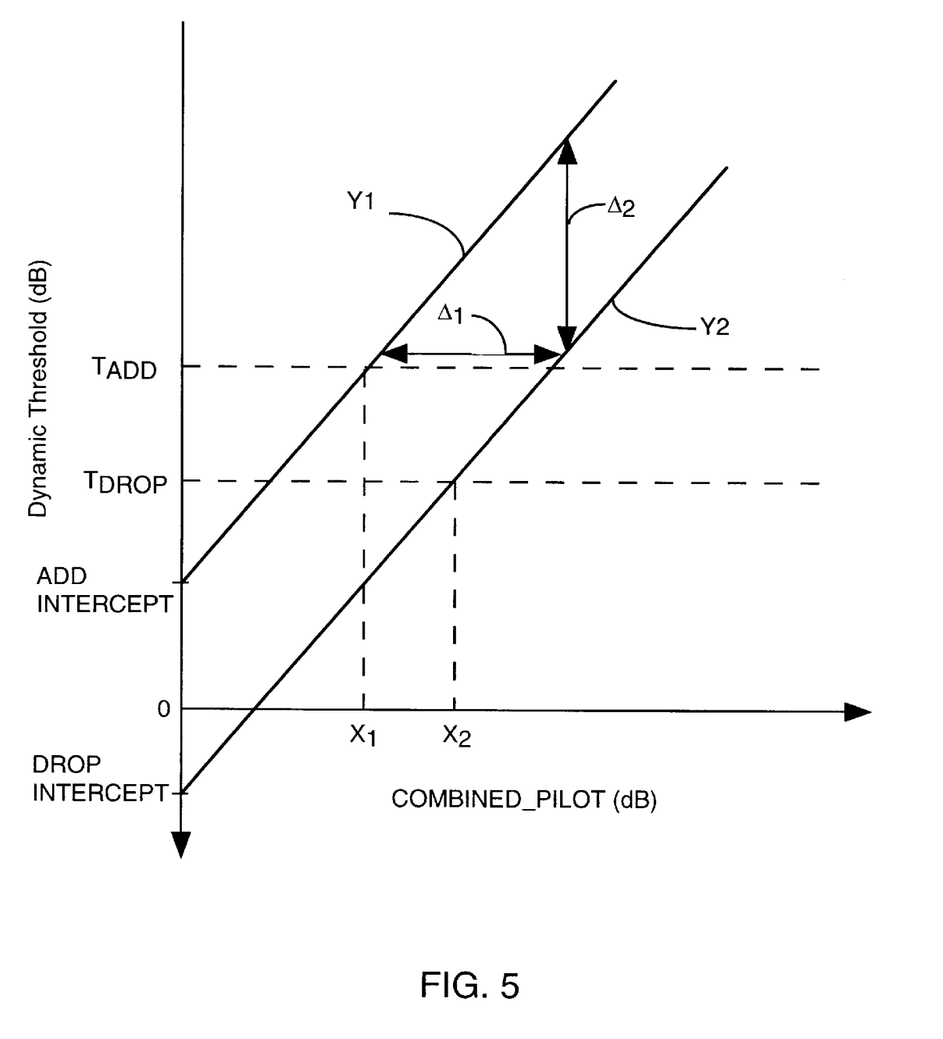
FIG. 5 is a graph of dynamic thresholds of the present invention versus the combined energies of the pilots in the active set, illustrating the linear operations performed on the soft handoff parameters of the present invention.

This relationship is further illustrated in FIG. 5. The dynamic thresholds Y1 and Y2 are plotted in dB as a function of combined pilot energy (i.e. $E_c/I_0$), also in dB. As can be seen, they are both linear functions with a slope of SOFT_SLOPE (i.e. $\Delta_2/\Delta_1$ from Equation (3)), and respective y-intercepts of ADD_INTERCEPT and DROP_INTERCEPT. Note that the y-intercept values may be negative, and DROP_INTERCEPT is illustrated in FIG. 5 as a negative value.

An exemplary value for SOFT_SLOPE is 2. In the preferred embodiment, the mobile station 2 itself may calculate the value of SOFT_SLOPE by estimating the desired values for $\Delta_1$ and $\Delta_2$ by monitoring the fluctuation of all pilots in both the active and candidate sets as described above with reference to FIG. 3, and then applying the relationship of Equation (3). The mobile station 2, and specifically control processor 62, may estimate the value of $\Delta_1$ by measuring the variations in COMBINED_PILOT over a predetermined amount of time. For example, $\Delta_1$ in the preferred embodiment is equal to the standard deviation of the COMBINED_PILOT over a predetermined period to prevent natural variations in COMBINED_PILOT from causing a handoff request. Additionally, $\Delta_2$ in the preferred embodiment may be set equal to the difference between $T_{ADD}$ and $T_{DROP}$ because the difference between $T_{ADD}$ and $T_{DROP}$ is the same order of hysteresis required for $\Delta_2$.

As previously discussed, $X_1$ is shown as the value of COMBINED_PILOT which is sufficient to cause a pilot to be added to the revised active set (i.e. where Y1 intersects $T_{ADD}$). Also, $X_2$ is shown as the value of COMBINED_PILOT which is sufficient to cause a pilot to be dropped from the active set (i.e. where Y2 intersects $T_{DROP}$). The value of $X_2$ may be pre-programmed into the mobile station, or provided to the mobile station in a signaling message from the base station. In the preferred embodiment, it is a value high enough to provide a sufficiently robust forward link, while at the same time avoiding unnecessary redundancy. An exemplary value for $X_2$ is $-7.11$ dB. In the preferred embodiment, the mobile station itself may determine the value $X_1$ from its calculation of $\Delta_1$, $\Delta_2$ and the known values of $X_2$ and $T_{DROP}$. Thus, if $\Delta_1=1.5$, $\Delta_2=3$, $X_2=-7.11$ dB, and $T_{DROP}=12.44$ dB; then SOFT_SLOPE=2, ADD_INTERCEPT=1.22 dB, DROP_INTERCEPT=−1.78 dB and $X_1=-7.61$ dB by Equations (1)–(5) above.

The handoff parameters illustrated above are generated at mobile station 2. These handoff parameters are used as described below to generate a revised active set. By generating the handoff parameters at mobile station 2, rather than at base station 4 or base station controller 6, they may be generated much more quickly and without excessive signaling. Additionally, this avoids having to perform any verification calculation at the base station 4 or base station controller 6. Mobile station 2 measures received pilot energy as described above with respect to FIG. 3. The pilot energy values are provided to control processor 62. In response, control processor 62 generates the handoff parameters. If, based on the handoff parameters generated by the mobile station, a pilot is required to be added to or dropped from the current active set, mobile station 2 transmits a message indicating the members of the revised active set to base station controller 6 through base stations 4. Base station controller 6 sets up communications with mobile station 2. Mobile station 2 reconfigures traffic channel demodulators 64A–64N to demodulate received signals in accordance with the mobile generated revised active set.

Figure 6:
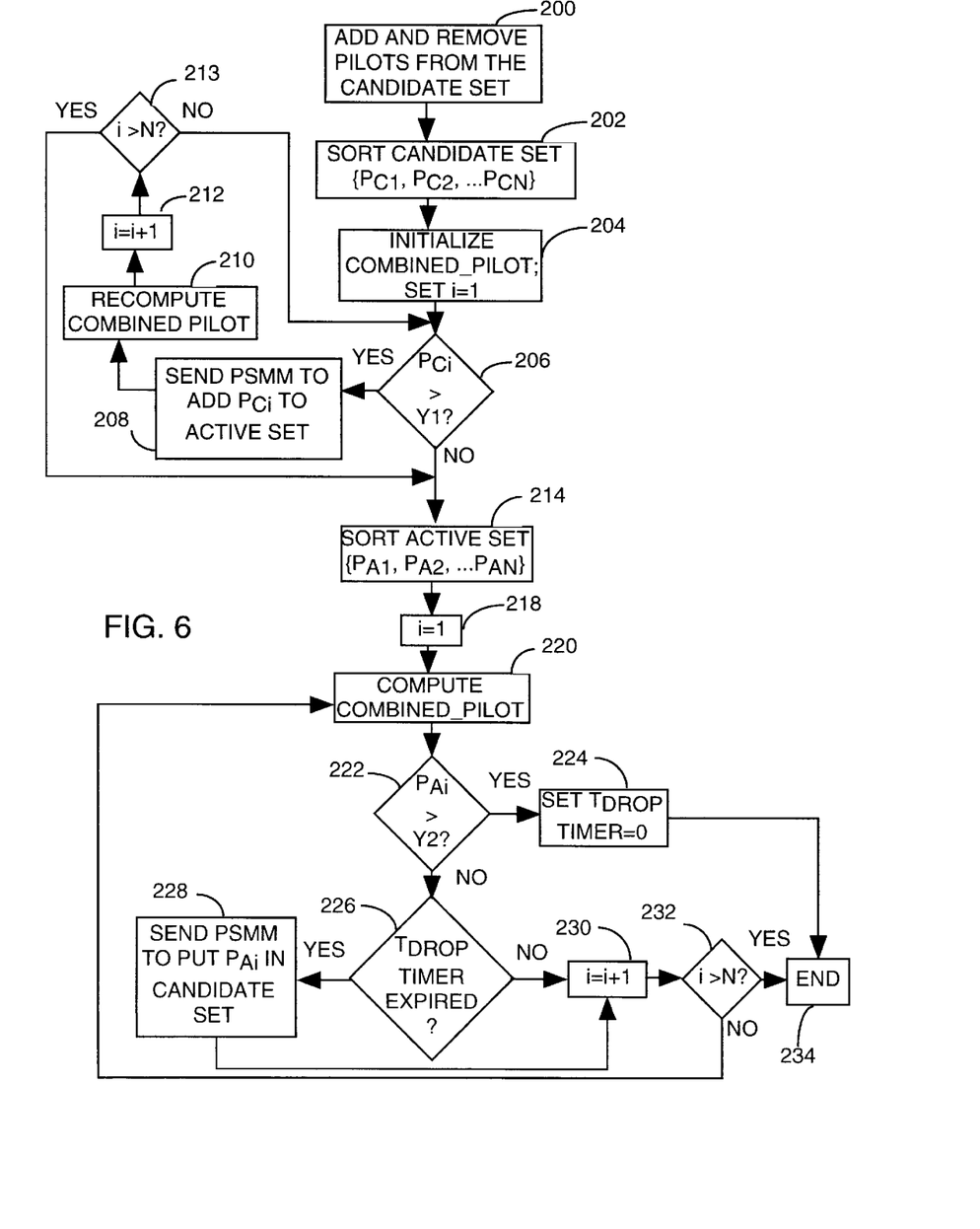
FIG. 6 is a flow diagram of the method for generating the revised active set in the mobile station.

In the exemplary embodiment, control processor 62 in mobile station 2 generates the revised active set in accordance with the method shown in FIG. 6. In block 200, pilots with measured energy in excess of threshold $T_{ADD}$ are added to the candidate list, whereas pilots whose measured energy has fallen below $T_{DROP}$ for more that a predetermined time period are removed from the candidate list. In the exemplary embodiment, the time a pilot is below $T_{DROP}$ is tracked by a timer within control processor 62 referred to herein as the $T_{TDROP}$ timer. The $T_{TDROP}$ timer is a timer than keeps track of the time that a pilot has been below the drop threshold. The purpose of the $T_{TDROP}$ timer is to avoid mistakenly dropping a strong pilot which may have a weak measured energy due to short duration change in the propagation environment, such as a fast fade.

In block 202, the pilots in the candidate list are sorted from strongest to weakest. Thus, $P_{C1}$ is stronger than $P_{C2}$, and so on, where $P_{ci}$ is preferably the $E_c/I_0$ for the candidate pilot I as defined in paragraph 6.6.6.2.2 of EIA/TIA IS-95A. In block 204, the variable COMBINED_PILOT is set equal to the energy of all pilots in the active set. Also, in block 204, loop variable (i) is initialized to the value 1. In block 206, the candidate set member $P_{Ci}$ is tested to determine whether it should be made part of the revised active set. $P_{Ci}$ is compared against a threshold generated in accordance with the current value of COMBINED_PILOT. In the exemplary embodiment, the threshold (Y1) is generated in accordance with equation (1) above.

If the pilot energy of $P_{Ci}$ exceeds threshold Y1, then the flow moves to block 208. In block 208, a Pilot Strength Measurement Message (PSMM) is sent from mobile station 2 to base station 4 requesting that pilot $P_{ci}$ be added to the active set. The base station 4 then sends a response message directing mobile station 2 to add pilot $P_{Ci}$ to the active set. In block 210, a new value of COMBINED_PILOT is computed which is equal to the old value of COMBINED_PILOT plus the energy of pilot $P_{Ci}$. In block 212, the loop variable (i) is incremented.

In block 213, it is determined whether all pilots in the candidate set have been tested. If all pilots in the candidate set have not been tested, then the flow moves to block 200 and proceeds as described above. If all pilots in the candidate set have been tested or if, back in block 206, the pilot energy of $P_{Ci}$ did not exceed threshold Y1, then the flow moves to block 214. In block 214, the revised active set is sorted from lowest energy to highest energy. Thus, $P_{A1}$, has the minimum measured energy in the revised active set, $P_{A2}$ has the second lowest and so on up to the last member of the revised active set $P_{AN}$.

In block 218, loop variable i is set to 1. In block 220, COMBINED PILOT for testing $P_{Ai}$ is computed. The value of COMBINED_PILOT is set equal to the sum of the measured energy of all pilots currently in the active set and having energy greater than the pilot currently being tested. Thus, COMBINED_PILOT is determined by the equation:

$$\text{COMBINED\_PILOT} = \sum_{j=i+1}^{N} P_{Aj} \quad (6)$$

where N is the number of pilots in the active set.

In block 222, the current pilot being tested is compared against a threshold (Y2) determined in accordance with the computed value of COMBINED_PILOT. In the exemplary embodiment, threshold Y2 is determined in accordance with equation (2) above. If the measured pilot energy $P_{Ai}$ exceeds threshold Y2, then the flow moves to block 224 and the $T_{TDROP}$ drop timers for pilots $P_{Ai}$ to $P_{AN}$ are reset to zero and determination of the revised active set ends in block 234.

If the measured pilot energy $P_{Ai}$ does not exceed threshold Y2, then the flow moves to block 226. In block 226, it is determined whether the $T_{TDROP}$ timer for $P_{Ai}$ has expired. If the $T_{TDROP}$ timer has expired, then, in block 228, the mobile station 2 sends a PSMM to base station 4 requesting that pilot $P_{Ai}$ be removed from the active set and put in the candidate set. Base station 4 sends an affirmative response message, and the flow proceeds to block 230. If in block 226, it is determined that the $T_{TDROP}$ timer for $P_{Ai}$ has not expired, then the flow proceeds directly to block 230. In block 230, the loop variable (i) is incremented. Then, in block 232, it is determined whether all the pilots in the active set $P_{Ai}$ have been tested. If all the pilots in the active set have been tested, then the flow proceeds to block 234 and generation of the revised active set is complete. If all the pilots in the active set have not been tested, then the flow proceeds to block 220 and proceeds as described above.

Figure 7:
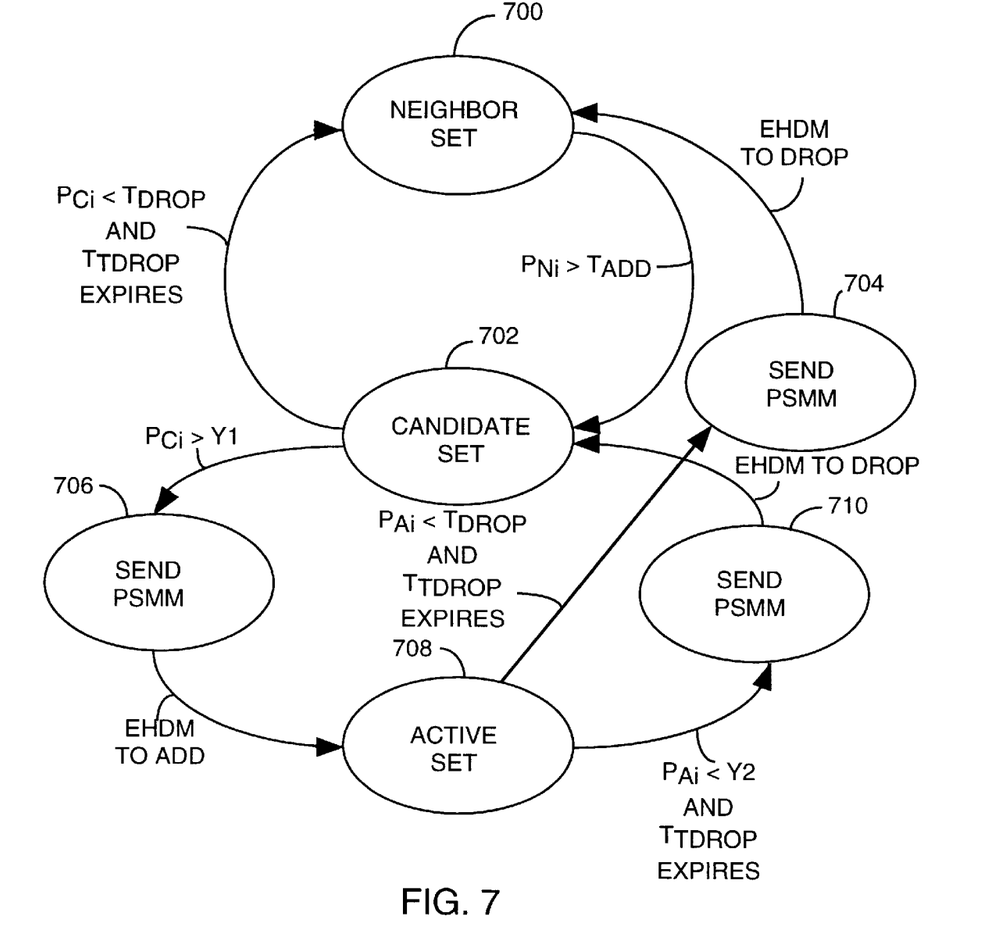
FIG. 7 is state diagram illustrating the operation of the present invention.

FIG. 7 shows a state diagram of the operation of the present invention. A given pilot, $P_{Ni}$, may begin in the neighbor set 700. If the $E_c/I_0$ of the pilot $P_{Ni}$ exceeds the threshold $T_{ADD}$, then it is added to the Candidate Set 702 by mobile station 2. If a pilot, $P_{ci}$, is in the candidate set 702, and its $E_c/I_0$ falls below the threshold $T_{DROP}$ and its $T_{TDROP}$ timer expires, then it is moved by mobile station 2 from the candidate set 702 to the neighbor set 700. These two transitions just described correspond to block 200 of FIG. 6—adding and removing pilots from the candidate set.

If the $E_C/I_0$ of a pilot, $P_{ci}$, in the candidate set exceeds the dynamic threshold Y1 as determined in accordance with Equation (1) above, then a PSMM 706 is sent by mobile station 2 to base station 4 requesting that $P_{ci}$ be added to the active set 708. In response, the base station 4 sends an Extended Handoff Direction Message (EHDM), directing mobile station 2 to add $P_{ci}$ to the active set 708. These two transitions just described correspond to blocks 202–213 of FIG. 6.

If the $E_C/I_0$ of a pilot $P_{ai}$, in the active set is less than the dynamic threshold Y2, and its $T_{TDROP}$ timer expires, the mobile station 2 sends a PSMM 710 to base station 4 requesting that pilot $P_{ai}$ be dropped from the active set. In response, base station 4 sends an EHDM, directing mobile station 2 to drop $P_{ai}$ from the active set to the candidate set 702. These two transitions just described correspond to blocks 214–228 of FIG. 6.

If the $E_C/I_0$ of a pilot $P_{ai}$, in the active set is less than the threshold $T_{DROP}$ and its $T_{TDROP}$ timer expires, the mobile station 2 sends a PSMM 704 to base station 4 requesting that pilot $P_{ai}$ be dropped from the active set. In response, base station 4 sends an EHDM, directing mobile station 2 to drop $P_{ai}$ from the active set to the neighbor set 702. There is no corresponding flow diagram herein for these two transitions.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for selecting base stations to communicate with a remote station, comprising the steps of:

measuring at said remote station signal energies for signals received from base stations capable of communicating with said remote station;

computing at least one dynamic threshold value using more than one of said signal energies;

comparing a signal energy of a first base station with said at least one dynamic threshold; and selecting said first base station when said signal energy of said first base station exceeds at least a designated one of said at least one dynamic thresholds.

2. The method in accordance with claim 1, wherein said at least one dynamic threshold value corresponds to an average value of said signal energies associated with communication channels currently assigned to said remote station.

3. The method in accordance with claim 1, wherein said designated one of said at least one dynamic threshold is calculated by performing a linear operation upon said signal energies for signals received from base stations capable of communicating with said remote station.

4. The method in accordance with claim 3, wherein said linear operation is performed on the linear relationship Y1, wherein Y1=SOFT_SLOPE*COMBINED_PILOT+ADD INTERCEPT.

5. The method in accordance with claim 1, wherein said signal energies associated with communication channels currently assigned to said remote station comprise pilot signal energy values.

6. The method in accordance with claim 3, wherein said linear operation is calculated in said remote station in response to a variation, over a predetermined time period, in said signal energies.

7. The method in accordance with claim 3 wherein said linear operation is calculated in said remote station in response to stored system parameters.

8. The method in accordance with claim 3, wherein said linear operation comprises the steps of:

multiplying said signal energies from base stations capable of communicating with said remote station by a first variable; and summing a second variable with the product of said multiplication.

9. The method in accordance with claim 1, further comprising removing a base station from an active set if said signal energies associated with said communication channels currently assigned between said base station and said mobile station falls below said designated one of said at least one dynamic threshold.

10. A signal processing apparatus used to direct communications between a mobile station and base stations, comprising:

more than one base station;

a mobile station; and at least one digital signal processor capable of processing digital signal instructions to:
measure at said remote station signal energies for signals received from base stations capable of communicating with said remote station;
compute at least one dynamic threshold value using more than one of said signal energies;
compare a signal energy of a first base station with said at least one dynamic threshold; and
select said first base station when said signal energy of said first base station exceeds at least a designated one of said at least one dynamic thresholds.

* * * * *